United States Patent
Strohl et al.

(10) Patent No.: US 9,762,517 B2
(45) Date of Patent: Sep. 12, 2017

(54) SYSTEM AND METHOD FOR SHARING MULTIMEDIA RECORDING IN A GIFT RECEIVING EVENT

(71) Applicant: Unrapp LLC, Pompano Beach, FL (US)

(72) Inventors: Steven Strohl, Pompano Beach, FL (US); Robert Durish, Huntersville, NC (US)

(73) Assignee: UNRAPP LLC, Pompano Beach, FL (US)

(*) Notice: Subject to any disclaimer, the term of this patent is extended or adjusted under 35 U.S.C. 154(b) by 2 days.

(21) Appl. No.: 15/079,695

(22) Filed: Mar. 24, 2016

(65) Prior Publication Data

US 2016/0285803 A1    Sep. 29, 2016

Related U.S. Application Data

(60) Provisional application No. 62/137,425, filed on Mar. 24, 2015.

(51) Int. Cl.
| | | |
|---|---|---|
| G11B 27/00 | (2006.01) | |
| H04L 12/58 | (2006.01) | |
| G06F 3/0484 | (2013.01) | |
| G06F 3/0488 | (2013.01) | |
| H04N 5/77 | (2006.01) | |
| H04N 5/232 | (2006.01) | |

(52) U.S. Cl.
CPC .......... H04L 51/10 (2013.01); G06F 3/04842 (2013.01); G06F 3/04883 (2013.01); H04N 5/232 (2013.01); H04N 5/77 (2013.01)

(58) Field of Classification Search
CPC ... G11B 27/034; G11B 2220/90; G11B 27/34; G11B 27/105; H04N 9/8042
USPC ......................................................... 386/278
See application file for complete search history.

(56) References Cited

U.S. PATENT DOCUMENTS

| | | | |
|---|---|---|---|
| 9,288,303 B1* | 3/2016 | Logan | H04M 1/72552 |
| 2013/0128058 A1* | 5/2013 | Sagayaraj | H04N 5/225 |
| | | | 348/207.1 |
| 2014/0074704 A1* | 3/2014 | White | G06Q 20/353 |
| | | | 705/41 |
| 2016/0224528 A1* | 8/2016 | Trevarthen | G06F 17/242 |

* cited by examiner

*Primary Examiner* — William C Vaughn, Jr.
*Assistant Examiner* — Daniel Tekle
(74) *Attorney, Agent, or Firm* — Richards Patent Law P.C.

(57) ABSTRACT

A multimedia gift system including: a user-facing camera; a touchscreen display; a wireless communication subsystem; and a controller configured to: display a user interface that receives user inputs, receive a multimedia gift message, initiate a video recording from the user-facing camera, display the multimedia gift message obscured by a wrapping image, in response to receiving a user touch input at a position on the touchscreen display: record the position and a timestamp associating the touch input to the recording; and remove an area of the wrapping image around the position to reveal a portion of the multimedia gift message, transmit, via the wireless communication subsystem, a recording including the video recording and a touch record including the position and timestamp of the user touch inputs.

8 Claims, 12 Drawing Sheets

SYSTEM AND METHOD FOR SHARING MULTIMEDIA RECORDING IN A GIFT RECEIVING EVENT

CROSS-REFERENCE TO RELATED APPLICATIONS

This application incorporates by reference and claims the benefit of priority to U.S. Provisional Patent Application No. 62/137,425 filed Mar. 24, 2015.

BACKGROUND OF THE INVENTION

The present subject matter relates generally to a system and method for sending gifts or multimedia and capturing the receiver's reaction. More specifically, the present invention relates to a system for purchasing online gifts and sending them to the receiver with the option to record the receiver as the receiver discovers or "unwraps" the gift, thus creating a multimedia recording that the sender may later view to see the receiver's reaction to receiving the gift as the gift is unwrapped.

Online gift giving is a great way to send gifts to people all over the world. It allows senders to quickly select a gift from a multitude of online retail sites, send the gift to the address of the recipient (or in the case of a gift card, send a gift card code to the recipient's email address), and then inform the recipient about the gift using a confirmation email. But by replacing in-person gift-giving with online gift-giving, senders often miss out on seeing the recipient's reaction to the gift.

For many people, witnessing the joy that receiving a gift gives to the recipient enhances, or is crucial, to the excitement and experience of gift-giving. This may be especially true for grandparents of small children or military personnel serving away from home. For these individuals, and more, gift-giving is enhanced by sharing in the experience at the moment when the recipient sees the gift.

But if the sender of an online gift wanted to see the recipient's reaction to the gift, the sender would need to coordinate a phone call or video call to take place at the time the recipient discovers the gift. This has practicality issues because it requires that both the sender and recipient be available for the call. Additionally, it may ruin the surprise of the gift.

Accordingly, there is a need for a system and method for capturing the reaction of gift recipients as they discover their gift so that the gift sender may see the reaction as it happened, as described herein.

BRIEF SUMMARY OF THE INVENTION

To meet the needs described above and others, the present disclosure provides a system and method for capturing the reaction of gift recipients as they virtually unwrap their gift so that the gift sender will see the reaction as the gift is revealed.

By providing a concealed image or multimedia file that may be virtually "unwrapped" by a recipient user and simultaneously recording the recipient user in the act of the unwrapping, the system and method allows users to send gifts to recipient users and watch their reaction as they reveal the gift. The system and method may be an integrated feature in an e-commerce platform or, alternatively, the system and method may be embodied in standalone software that operates across multiple platforms. Additionally, the system may operate in connection with a social network.

The system and method may operate to facilitate the transmission of a multimedia gift message to a designated recipient. The multimedia gift message may be a gift card with a code, an image, or other multimedia file. For example, the multimedia gift message may be video or images with or without accompanying audio. The multimedia gift message may include overlays such as text, images, emoji, etc., overlain over the image or video. To initiate the system, a sending user may send a gift to a recipient user along with a request to record the user as they reveal the gift.

The image may appear to the recipient in a "wrapped" state. This wrapping may consist of a removable or interactive veil that appears over the image to conceal it from the recipient user. When the recipient receives the wrapped image, they may have the option to approve the recording and/or select the nature of the recording (for example, picture and audio, picture only, audio only). Once the recipient agrees to or refuses the recording, the recipient may access the wrapped gift. In various embodiments, the recording of the receiver's reaction may be audio and video, video only, an image, or audio only.

The unwrapping process may consist of an interactive gesture such as swiping a cursor or finger over the wrapping. Alternately, the process may be initiated automatically by a recipient user option. In this situation, the sending user may have specified the speed and orientation of the unwrapping process. The system contemplates multiple methods for the unwrapping process.

If the recipient has agreed to be recorded, the recording may begin as soon as the recipient begins to unwrap the multimedia gift message. The recording may last for a pre-designated time (i.e., until ten seconds after the gift is completely unwrapped) or it may last until the recipient user ends the recording. The recipient user may also have the option to end the recording at any time. In some embodiments, when the recipient does not agree to the recording, they may still have the ability to unwrap and reveal the gift.

When the recording and unwrapping process is complete, the recording may be automatically transmitted back to the sender, or the recipient may have the option of sending the recording back to the sender. The recipient may additionally have the option to review the recording before sending.

The playback of the recording may display as a picture-in-picture video, with one picture showing the progression of the unwrapping process while the other picture shows the recipient's reaction. This playback may be timed to the reveal of the gift, where the unwrapping process is revealed in sync with the recipient's reaction. While viewing, the sending user may have the ability to toggle the picture-in-picture display or adjust the size of the picture-in-picture. The sending user may also have all options associated with video playback, including pause and the ability to skip forwards or back in the recording.

In a preferred embodiment, the system may operate within a software application incorporating elements of a social media network. Users may maintain user accounts with communication capabilities for sending and receiving their gifts. Additionally, the social network may incorporate user contributions in the form of posted entries on public forums where users may post the reaction videos they have sent and received.

In other embodiments, the system may function through the use of a website or software application, whereby the user uploads an image to the system so that it may be virtually wrapped and sent to a recipient. The system may also be integrated with e-commerce platforms, enabling users to send gifts to recipients at the point of purchase.

The recording system may be integrated with other features available to customize online gift-giving. For example, some systems enable gift recipients to edit the shipment information for their online gift, or edit a size selection in the case of a clothing gift. The recording system described herein may be integrated with these platforms, allowing gift recipients the change to discover their gift and then later proceed to the options for customizing it.

The system may also have features to add interest and complexity to the gift unwrapping. For example, the system may offer a variety of scenes to present the presents in for the recipient user. One potential scene may be a Christmas tree with wrapped gifts underneath it. The sending user may also have the option of incorporating multiple gifts into one scene, where each gift may initiate a separate recording. The scene may be presented to multiple recipients, wherein each wrapped gift is directed towards a specific recipient. Alternately, the wrapped gifts appearing in the scene may be generic representations that will reveal the appropriate gift based on the recipient user who selects the gift. This may allow recipient users to engage with the system by selecting a gift representation they prefer.

Although this specification is primarily directed towards online gifts, the system described herein may be applied in any situation where a sending user sends a message to a receiving user. The message may include a picture, written text, a video or any other multi-media file. As the recipient unwraps the image file, the system will record the recipient's reaction to the message.

In an embodiment, a multimedia gift system includes: a user-facing camera; a touchscreen display; a wireless communication subsystem in communication with a central system; a controller that controls the touchscreen display, the user-facing camera, and the wireless communication subsystem; and a memory in communication with the controller, the memory including instructions, that when executed by the controller, cause the controller to: display, through the touchscreen display, a user interface that receives user inputs, receive, via the wireless communication subsystem, a multimedia gift message, initiate a video recording from the user-facing camera, display the multimedia gift message obscured by a wrapping image, in response to receiving a user touch input at a position on the touchscreen display: record the position and a timestamp associating the touch input to the recording; and remove an area of the wrapping image around the position to reveal a portion of the multimedia gift message, transmit, via the wireless communication subsystem, a recording including the video recording and a touch record including the position and timestamp of the user touch inputs, receive, via the wireless communication subsystem, a second recording including a second video recording and a second touch record associated with a second multimedia gift message, and display, on the touchscreen, the second video recording and the second multimedia gift message obscured by a second wrapping image, wherein, for each position and timestamp of the second touch record, upon playback of the second video recording reaching the timestamp, an area of the second wrapping image around the position is removed to reveal a portion of the second multimedia gift message.

In an embodiment, the memory includes further instructions, that when executed by the controller, cause the controller to: display, on the touchscreen, a preview of the view from the user-facing camera and a request to permit video recording, and receive an input indicating acceptance of video recording. Also, in an embodiment, the wrapping image completely obscures the multimedia gift message. And, in an embodiment, the area is a circular area with a diameter corresponding to the width of a human finger. Further, in an embodiment, the area is a circular area with a diameter less than twenty millimeters.

In an embodiment, the memory includes further instructions, that when executed by the controller, cause the controller to: display, on the touchscreen, a create gift screen prompting the user to input a user-selected multimedia gift message and a user-selected wrapping image, receive an input of the user-selected multimedia gift message as the second multimedia gift message, receive an input of the user-selected wrapping image as the second wrapping image, and transmit, via the wireless communication subsystem, the second multimedia gift message and the second wrapping image to the central system.

In an embodiment, the multimedia gift message includes an image representing a gift card. And, in an embodiment, the multimedia gift message includes a video. Additionally, in an embodiment, the multimedia gift message includes an image with accompanying audio.

An object of the invention is to provide recordings of gift-giving moments that otherwise would have been missed by the gift-giver.

Another object of the invention is to allow gift-givers to send information about gifts to recipients in a creative and interactive way.

An advantage of the invention is that it gives users the ability to view a reaction and the cause of a reaction in a single screen view. This allows the sending user to see why the recipient user may react a certain way at a specific moment.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE INVENTION

Figure 1A:
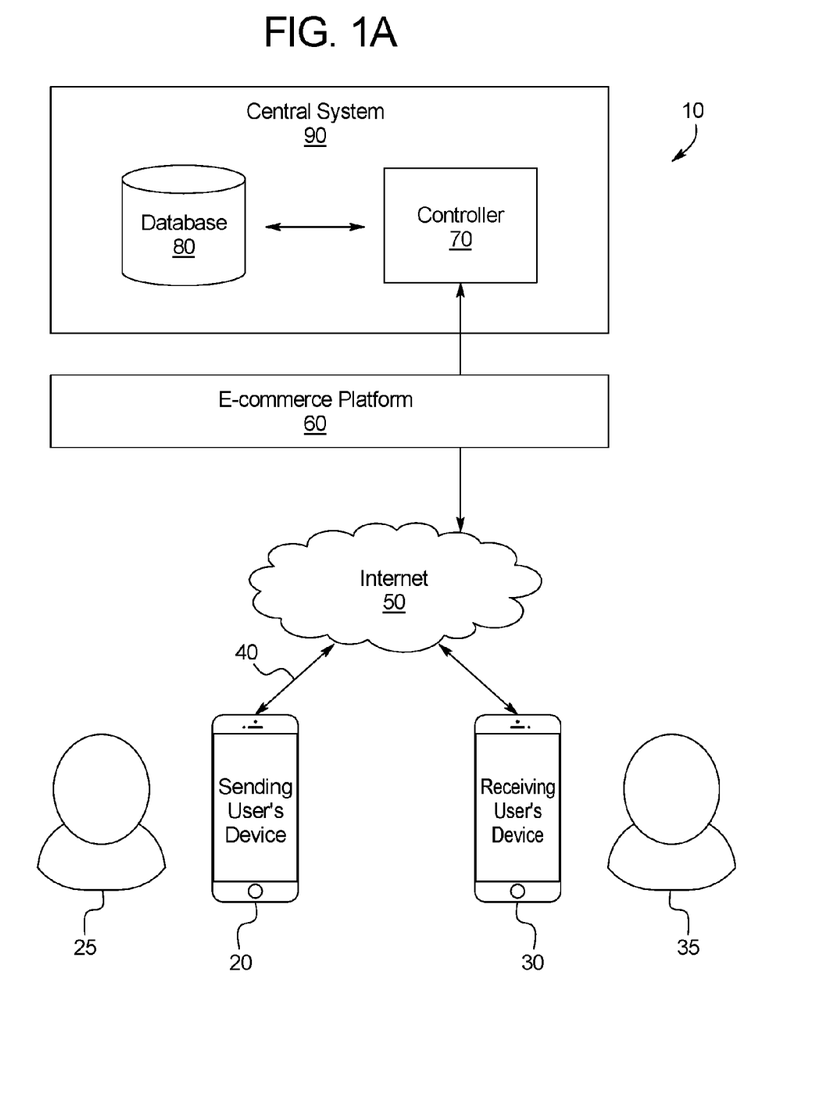
FIG. 1A is a schematic view of the system disclosed herein to permit a sending user to send a multimedia gift message to a receiving user and, in return, to receive a reaction video of the receiving user opening the gift message.

A multimedia gift system 10 may includes a sending user device 20 and a receiving user device 30. Wired or wireless communication links 40 may relay communication between the devices across the Internet 50. A central system 90 may coordinate the devices and may includes a controller 70 or on an application running on the mobile devices 20 and 30. A database 80 used in connection with the controller 70 stores data, such as multimedia gift messages or reaction videos, that is received and provided to the sending user device 20 and a receiving user device 30.

In some embodiments, the central system 10 may be integrated with an e-commerce platform 60 accessed through the Internet 50 to allow users to access the central system 10 while they shop using the e-commerce platform 60. The gift application 141 may interact with the central system 10 and the e-commerce platform 60 to provide the functionality described herein. The e-commerce platform 60 and the controller may each provide a web site accessible by the user device 20, 30 or may provide their functionality through an application-programming interface accessible through the gift application 141.

Figure 1B:
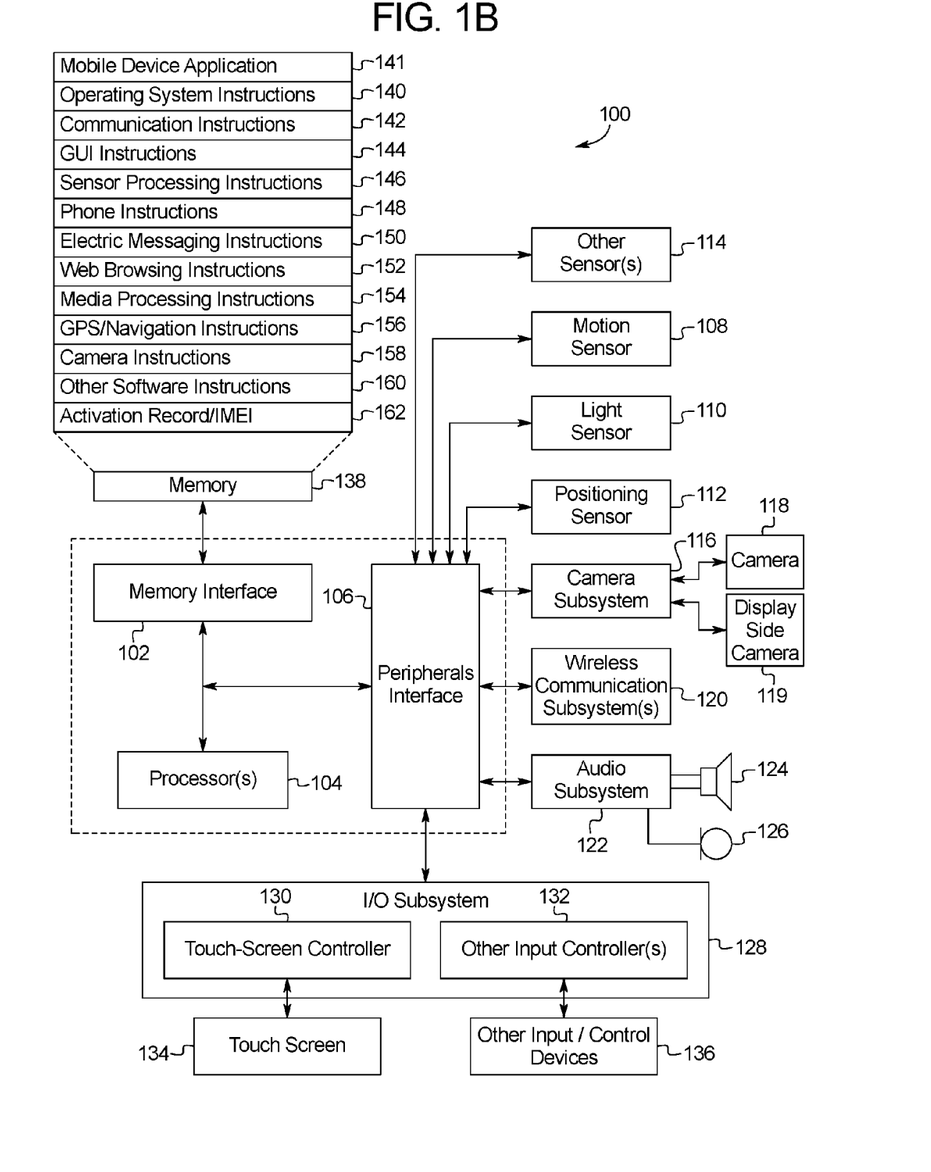
FIG. 1B is a block diagram representation of an implementation of a mobile device as illustrated in the system of FIG. 1.

In an embodiment, both the sending user device 20 and the receiving user device 30 may each be a mobile devices 100 shown in FIG. 1B, such as a smartphone or tablet. The mobile devices 100 may include a controller 104 running a gift application 141 to carry out the functionality described herein. The mobile device 100 of the receiving user 35 may include a display-side camera 119 to record reactions to the multimedia gift message 222 being displayed on a touch-screen 134.

Figure 2:
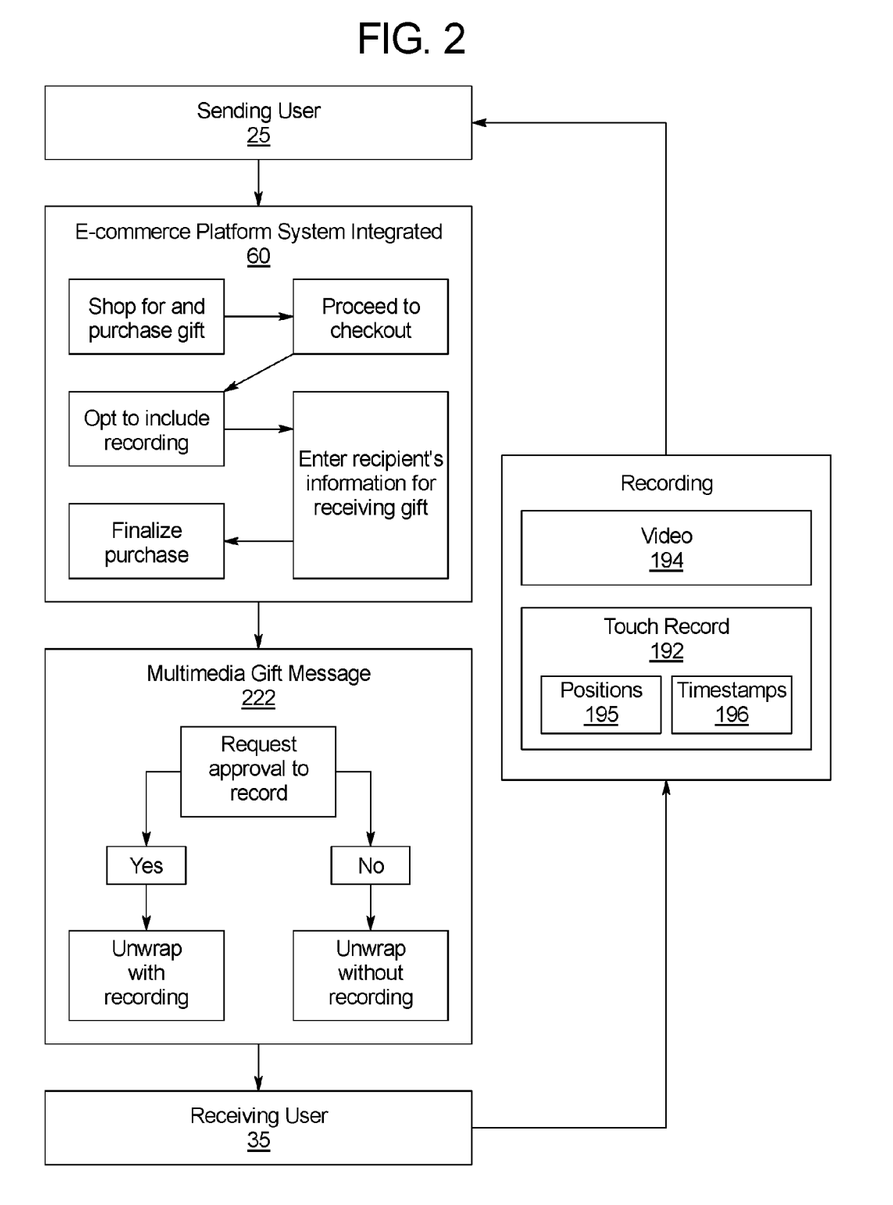
FIG. 2 is a flow-chart illustrating the steps to sending a gift using the system.

Turning to FIG. 2, a sending user 25 may open the gift application 141 on the device 20 and access the e-commerce platform 60. There, the sending user 25 may purchase a gift for a receiving user 35, such as a gift card, and choose to create a multimedia gift message 222. The resulting multimedia gift message 222 may be stored in the database 80 and/or transmitted from the controller 70 through the Internet 50 to the receiving user's device 30.

The receiving user 35 may access the recipient communication 222 using the mobile gift application 141 running on their device 30. The recipient communication 222 may include options for whether the gift application 141 on her device 30 will make a recording 226. If the recipient user 35 agrees to a recording 226, the mobile gift application 141 will initiate the unwrapping process and begin recording. When the recording 226 is complete, the gift application 141 may store the recording 226 of the unwrapping event in the database 80. The controller 70 may, in turn, send the resulting recording 226 to the sending user 25. The recording 226 may be transmitted via the Internet 50 through traditional communication channels like e-mail or through the gift application 141 running on the sending user device 20.

Figure 3A:
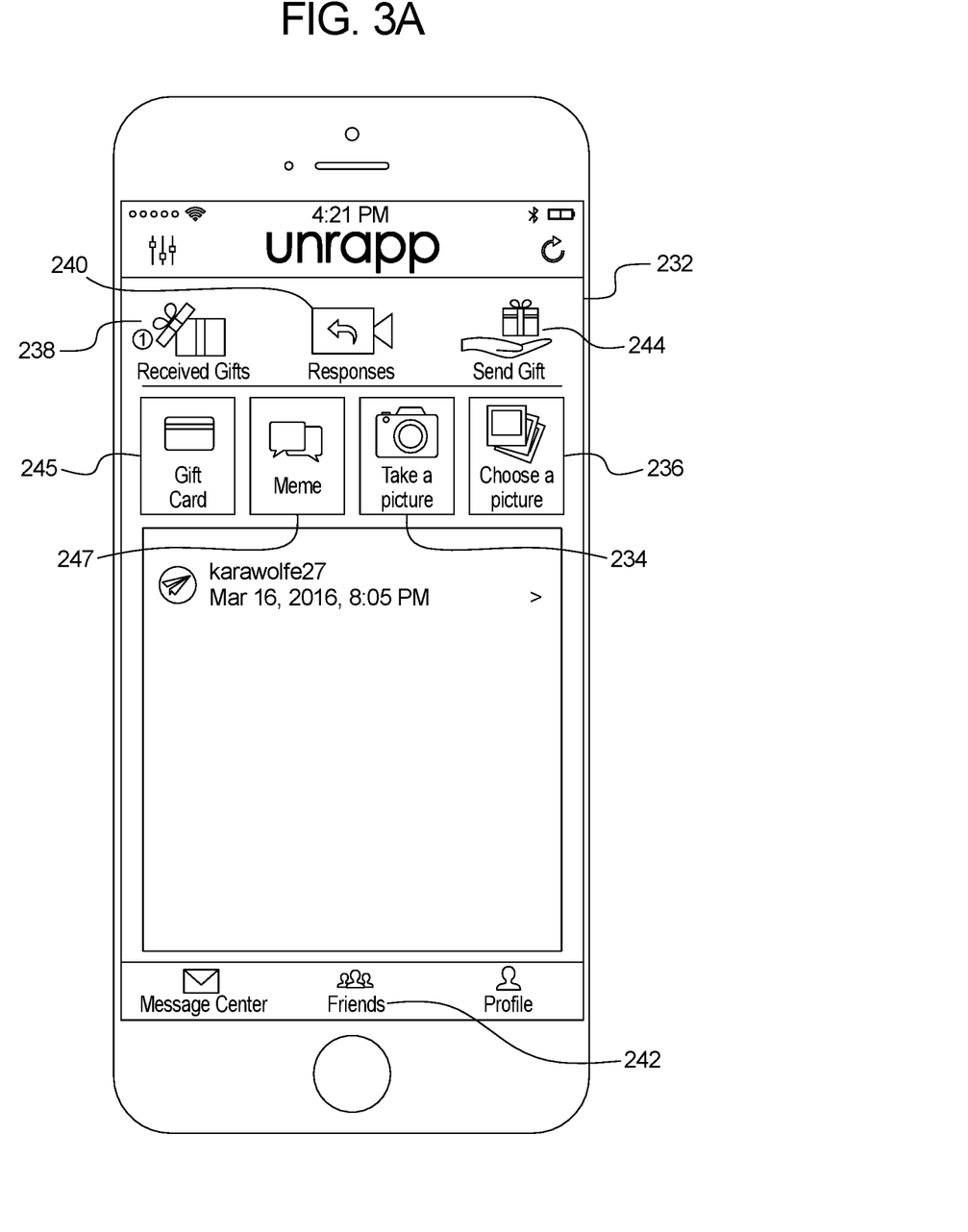
FIG. 3A is an example of a display on a user interface including various options create a multimedia gift message.

Turning to FIG. 3A, the gift giving process may begin with a sending user 25 accessing a create gift screen 231 of the gift application 141 displayed on a user interface 232 of the sending user's device 20. The create gift screen 231 may include a take a picture button 234 or a choose an already existing photo button 236 to permit the user to take a new image using either the rear-face 118 or the display-side camera 119 of the mobile device 20 or access an image from the photo library of the user device 20, respectively. In some embodiments, the sending user 25 may additionally take a new video or access a video from the photo library to incorporate into the multimedia gift message 222. Additionally, the sending user 25 may select to create a multimedia gift message 222 include a gift card using the gift card button 245. Further, the user may select to create a multimedia gift message including a meme (an image including superimposed text) using a meme button 247.

As shown in FIG. 3A, each screen of the user interface 232 may include a gifts button 244 that takes the user to the create gift screen 231. Additionally, each screen may also include buttons to access the other functions of the gift application 141. For example, to view received gifts, the user may press the received gifts button 238 to open the received gifts screen 267 of FIG. 4. To view responses to previously sent multimedia gift messages 222, the user may press a received responses button 240 to view the recordings 226 of the received responses. Further, the user may press a friends button 242 to view a listing of friends in the social network 230.

Figure 3B:
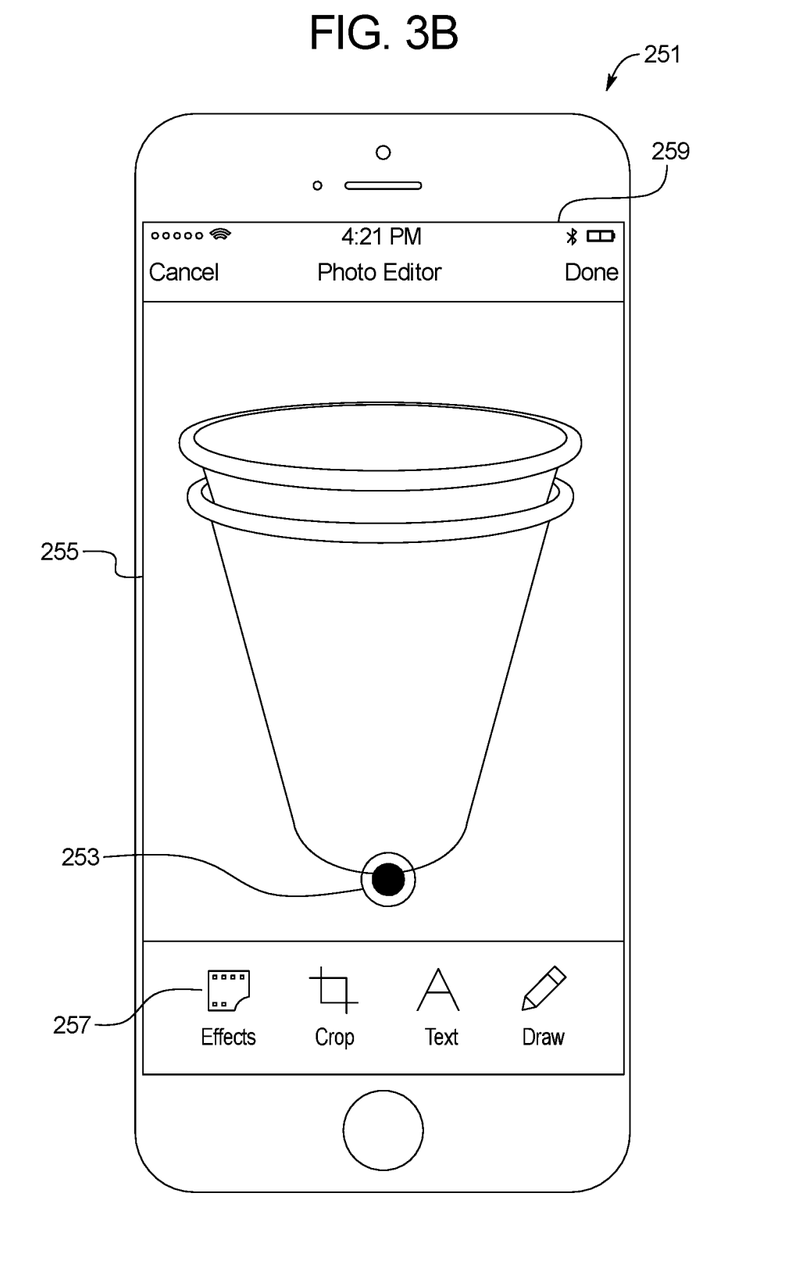
FIG. 3B is an example add media screen that permits a sending user to capture new images or video for inclusion in a multimedia gift message.

FIG. 3B illustrates an add media screen 251 that permits a sending user 25 to capture new images or video for inclusion in a multimedia gift message 222. The add media screen 350 may include a shutter button 253 that the sending user 25 may press to capture and image or video. Once the sending user 25 has captured the media 255, the sending user 25 may apply various effects to the media 255 from an effects bar 257, for example, the media 255 may be cropped, have various special effects applied to it, have text or hand drawings placed on top of the media 255, etc. When the sending user 25 is done editing the media 255, the sending user 25 may press a done button 259 to send the multimedia gift message 222. In some embodiments, after the user has inputted media 255, the sending user 25 may select a wrapping paper that will be displayed before the gift is unwrapped, and then confirm the sending of the multimedia gift message 222.

When the receiving user device 30 receives a new multimedia gift message 222, the receiving user 35 may be notified. For example, the receiving user 35 may receive an email regarding the gift message 222, a popup box may appear on her user device 30, or a red numeric badge may be displayed over the received gifts button 238.

Figure 4:
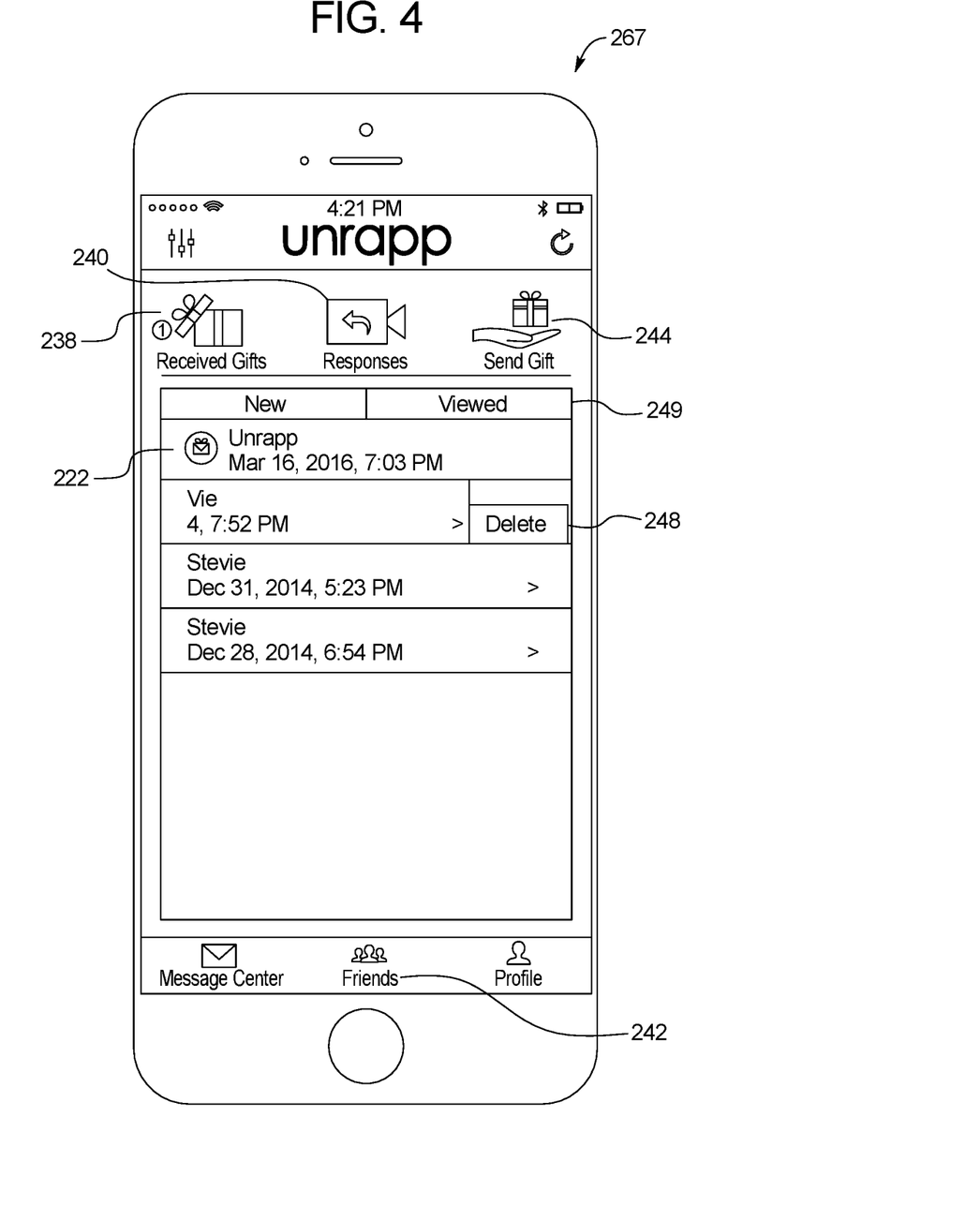
FIG. 4 is an example received gifts screen to permit a user to view and delete received multimedia gift messages.

To view a received multimedia gift message 222, the receiving user 35 may press the received gifts button 238 to open the received gifts screen 267 of FIG. 4. The received gifts screen 267 may include a list of the multimedia gift messages 222 that the receiving user 35 has newly received. The receiving user 35 may also be able to toggle between the list of new multimedia gift messages 222 and a list of previously received and viewed gift messages 222 by pressing either the "New" or "Viewed" button on a "New/

Viewed" toggle switch 249. Each listed gift message 222 may include the name of the friend sending the gift message 222 and the time the gift message 222 was received. The receiving user 35 may click on a gift message 222 to view it. Alternatively, the receiving user 35 may swipe left over the gift message 222 to access a delete command 248 that, when pressed, deletes the gift message 222.

Figure 5:
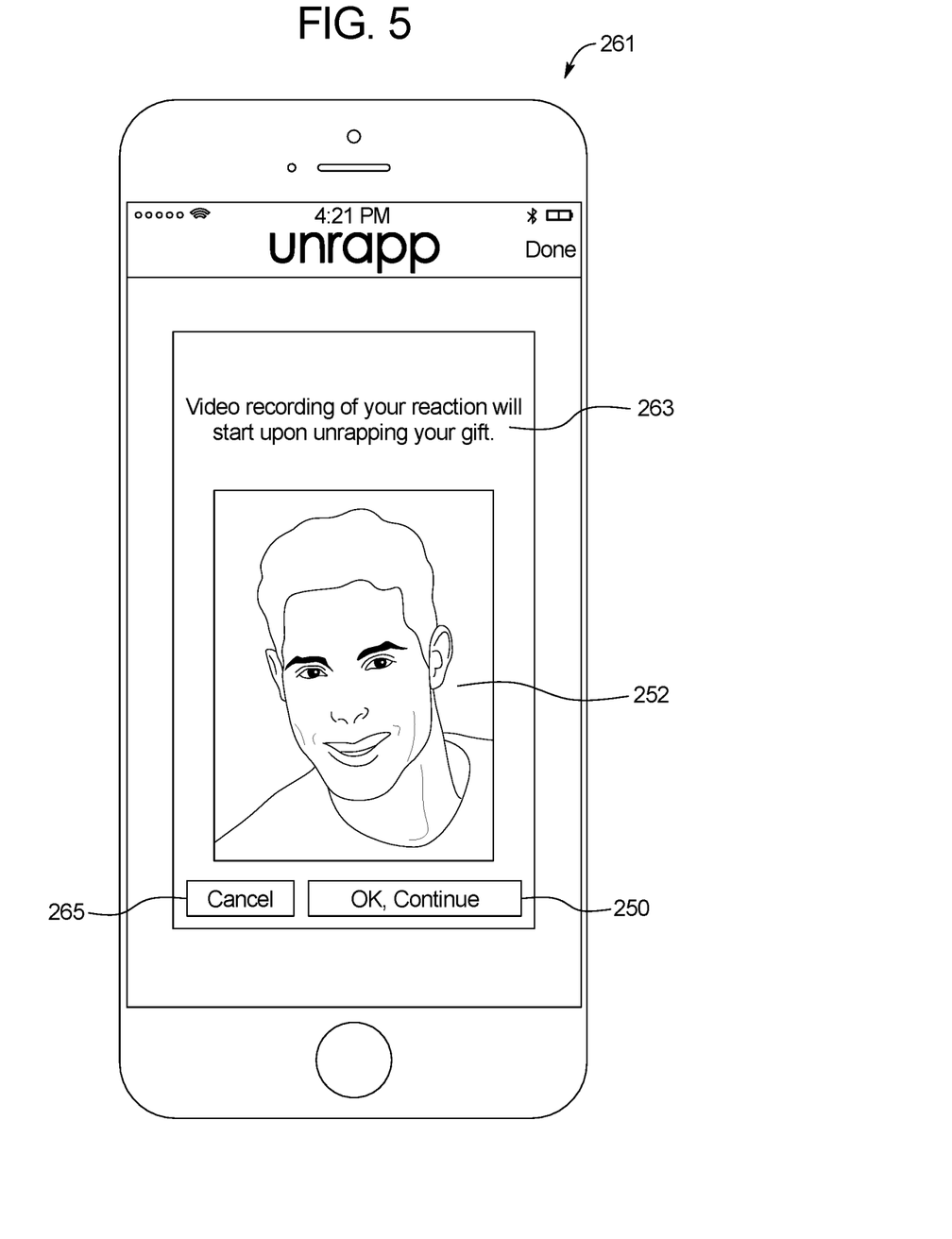
FIG. 5 is an example approval screen to permit a receiving user to approve a recording of her reaction to the multimedia gift message.

Before the gift message 222 is displayed, the receiving user 35 may be prompted to approve a recording of their reaction to the gift message 222 as shown in the approval screen 261 of FIG. 5. For example, a prompt 263 may remind the user that the "[v]ideo recording of your reaction will start upon unrapping your gift." The approval screen may include a preview 252 of the view from the display-side camera of the receiving user device 30 to permit the receiving user 35 to see a preview of the view that will be recorded by the gift application 141. The receiving user 35 may choose an accept button 250 to approve the recording and view the gift message 222 or click a decline button 265 to return to the received gifts screen 267. After click the accept button 250, the receiving user 35 may be taken to a gift screen 270 and the application 141 may begin recording the receiving user's reaction.

Figure 6A:
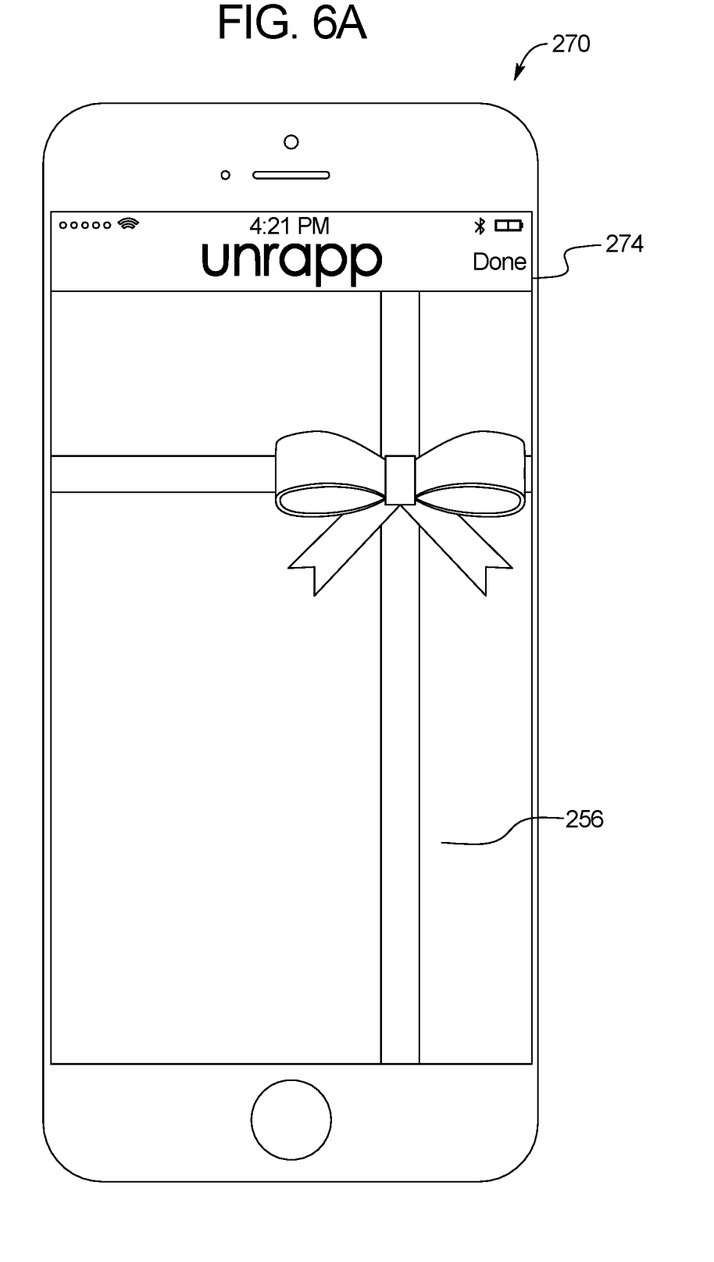
FIG. 6A is an example of a display for unwrapping a gift message including a multimedia gift message obscured by a wrapping paper image.
Figure 6B:
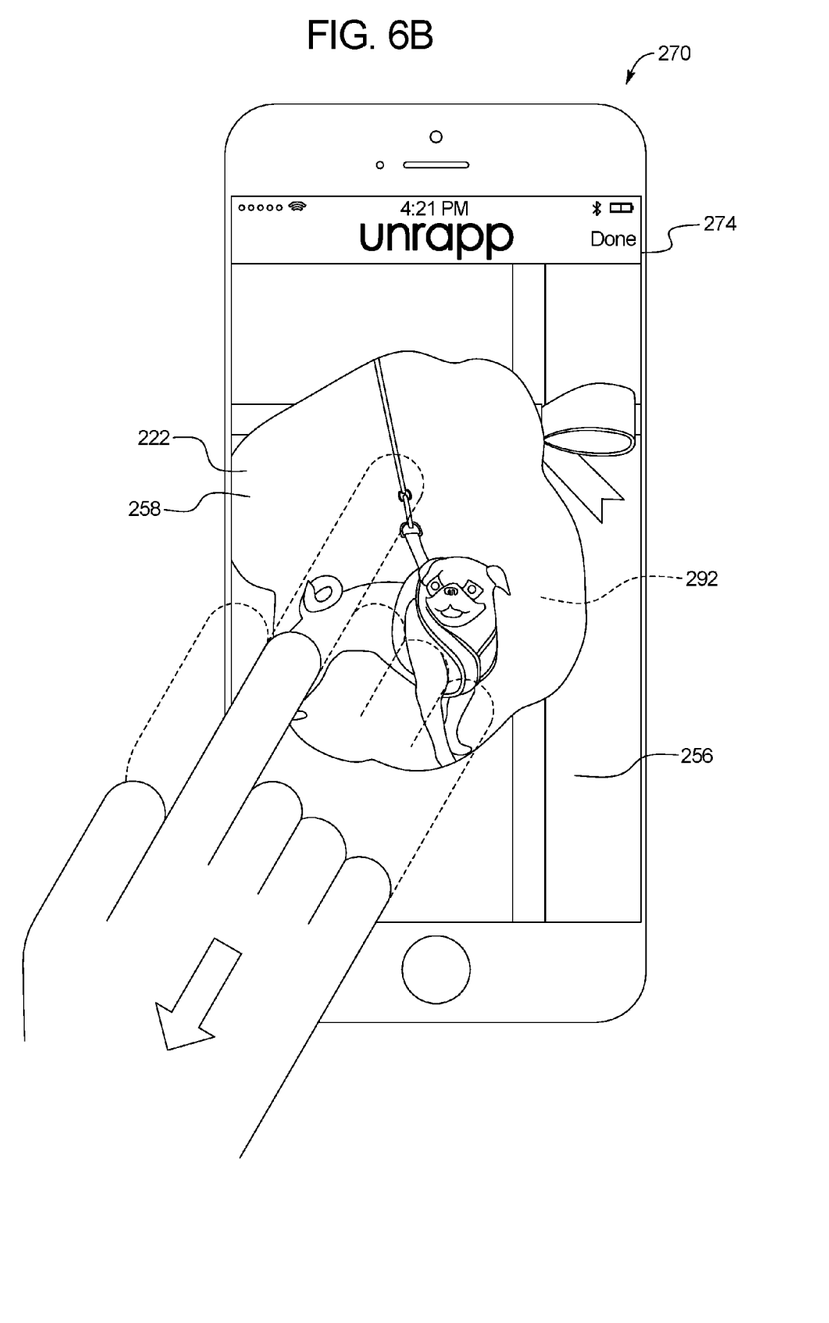
FIG. 6B is an example of a display for unwrapping a gift message illustrating a portion of the wrapping paper image removed by a user gesture to reveal the gift message underneath.

Shown in FIGS. 6A and 6B, the gift screen 270 is an interactive screen wherein the multimedia gift message 222 is hidden under a wrapping paper image 256. When the receiving user 35 touches the touchscreen, an area of the wrapping paper image 256 at the touched location is erased, revealing portions 258 of the gift message 222. (In an embodiment, the area revealed may be a predetermined radius around the touched location.) The receiving user 35 may move her finger around on the touchscreen 134 until the gift message 222 is revealed to her satisfaction. In addition to making a video recording 294 (FIG. 8) of the user's reaction using the display-side camera 119, the application 141 may include a touch record 292 in the recording 226, the touch record 292 including a record of the movement of the user's finger along the touchscreen 134. In an embodiment, the touch record 292 may include both the positions 195 of the user's touch and timestamps 196 indicating a time of each touched location. The timestamps 196 may be associated with corresponding timestamps of the video recording to permit for playback of the recording 226 that correctly shows the simultaneous uncovering of the multimedia gift message 222 and the receiving user's reaction.

When the multimedia gift message 222 is a video or an image with sound, the application 141 may require that a threshold percentage of the wrapping paper image 256 be erased before beginning playback of the video or beginning playback of the sound. Additionally, in some embodiments, when the multimedia gift message 222 is a video or an image with sound, there may be a designated start area such that playback of the video or sound is triggered only upon the start area being revealed. For such embodiments, the sending user 25 may be prompted by the application 141 to designate a start area on the add media screen 251. For example, the add media screen 251 may include an insert start area button, that when pressed, permits the user to touch the start area on the gift message 222 to define it.

Once the receiving user 35 has viewed the multimedia gift message 222 to her satisfaction, she may press the done button 274 to stop the recording and return to the received gifts screen 267. Upon the receiving user 35 pressing the done button 274, the recording 226 including both the video recording 294 of the user and the touch record 292 may be transmitted to the central system 90 for storage in the database 80 and for forwarding to the sending user device 20.

Figure 7:
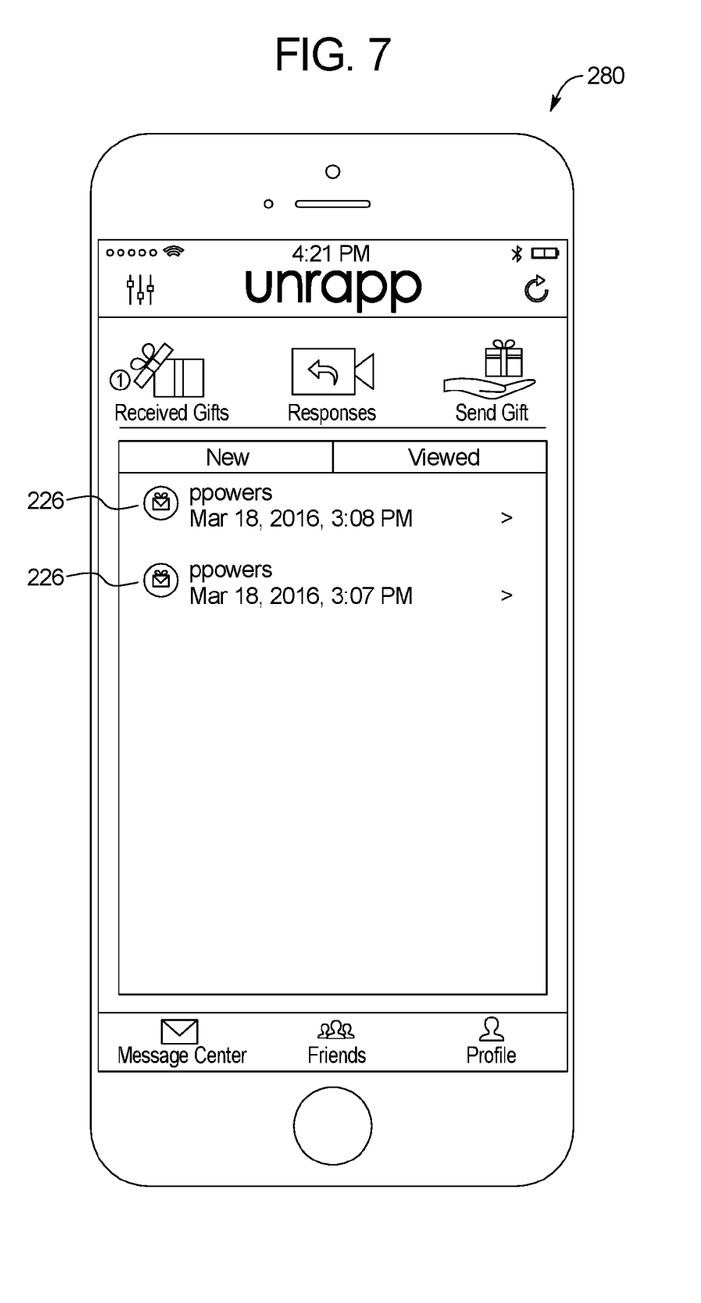
FIG. 7 illustrates a received responses screen listing the received responses to a send user's gift messages.

When the sending user device 20 receives a new recording 226, the sending user 25 may be notified that a response recording of the friend's reaction has been received. For example, the sending user 25 may receive an email regarding the gift message 222, a popup box may appear on her user device 20, or a red numeric badge may be displayed over the received responses button 238. The sending user 25 may click the received responses button 238 to access a received responses screen 280 to view the receiving user's response to the multimedia gift message 222.

Accordingly, turning to FIG. 7, illustrated is a received responses screen 280. The received responses screen 280 may include a list of recordings 226 of user responses to multimedia gift messages 222. For each recording 226, the received responses screen 280 may include the username of the receiving user 35, and the time that the recording 226 was received. The sending user 25 may click a recording 226 to view it in a recording playback screen 290.

Figure 8:
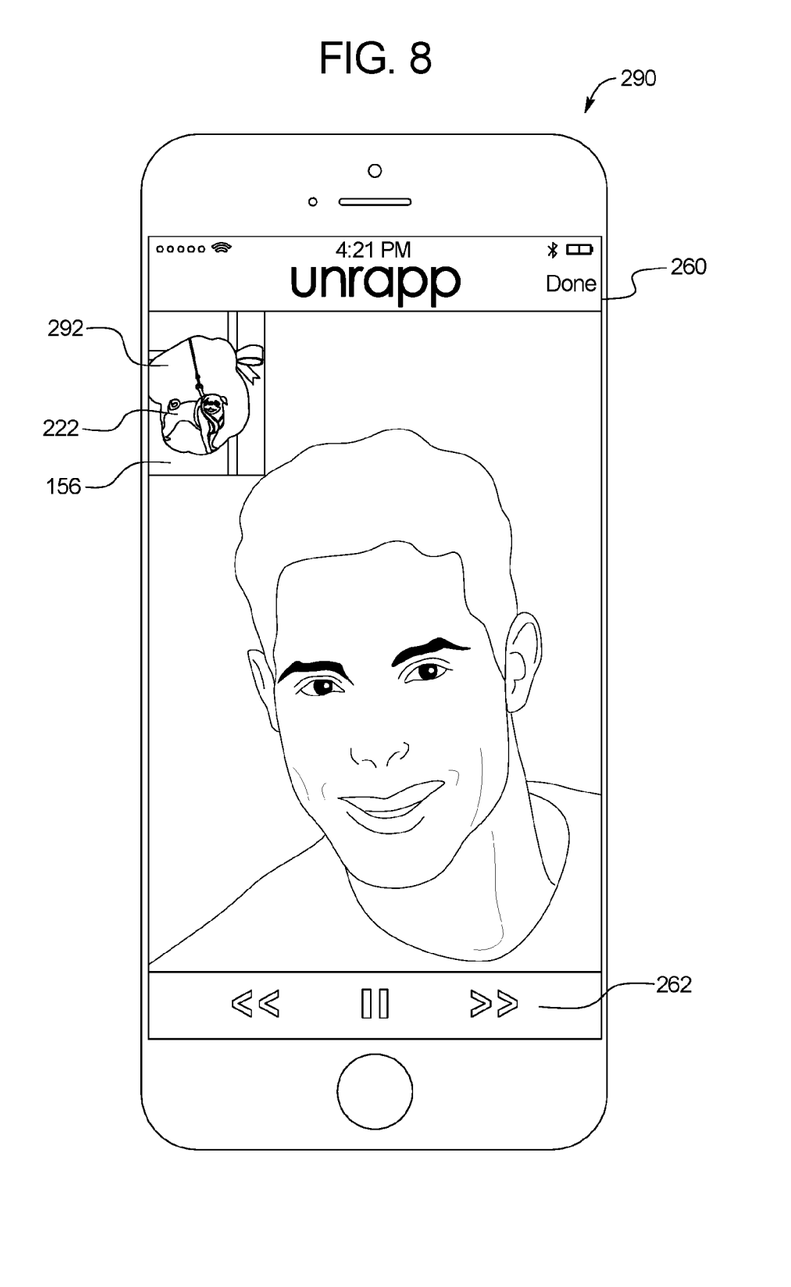
FIG. 8 is an example of a display on a user interface showing the picture-in-picture reaction and unwrapping video with playback functionality.

Turning to FIG. 8, shown is a recording playback screen 290 that illustrates the playback of the recording 226. As shown, in an embodiment, the recording 226 may be displayed using a picture-in-picture display 260 with the touch record 292 displayed inside the video recording 294. The video recording 294 and the touch record 292 may be synched and played back simultaneously so that the touch record 294 accurately reflects what the user was seeing on the gift screen 270 concurrently with the reaction of the user in the video recording 294. The picture-in-picture display 260 may include playback functionality 262 allowing the user to skip forwards or backwards in the video, rewind, fast-forward, pause it or play it.

Figure 9:
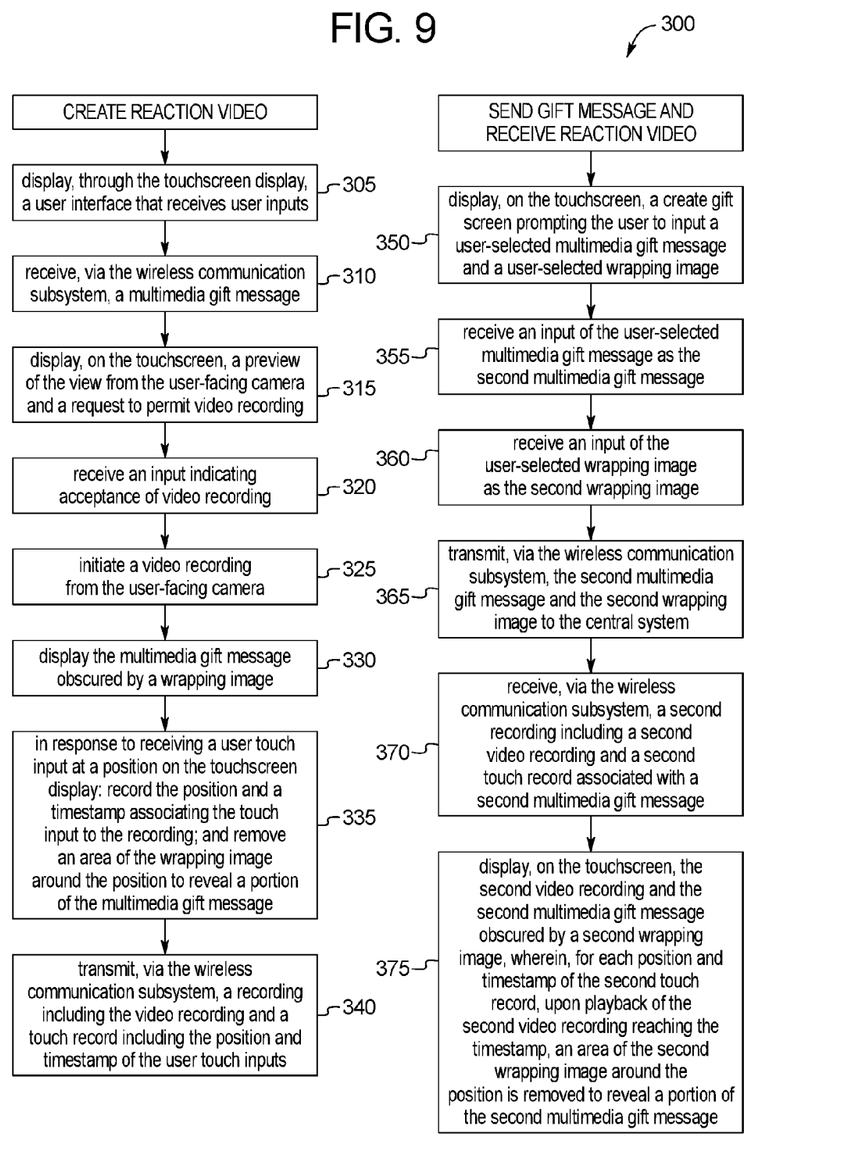
FIG. 9 is a flow-chart illustrating a method to permit a user to receive gift messages and return reaction videos and to create a gift message and receive reaction videos in accordance with the invention.

In an embodiment, a multimedia gift system 10 may include a user-facing display side camera 119; a touchscreen display 134; a wireless communication subsystem 120 in communication with a central system 90; a controller 104 that controls the touchscreen display 134, the camera 119, and the wireless communication subsystem 120; and a memory 138 in communication with the controller 104, the memory including instructions, the mobile device application 141, that when executed by the controller 104, cause the controller to carry out a method 300, shown in FIG. 9, to permit a user to receive gift messages and return reaction videos and to create a gift message and receive reaction videos.

In an embodiment, to permit a user to receive gift messages and return reaction videos, the method 300 includes the steps of: at step 305 display, through the touchscreen display, a user interface that receives user inputs; at step 310, receive, via the wireless communication subsystem, a multimedia gift message; at step 315, display, on the touchscreen, a preview of the view from the user-facing camera and a request to permit video recording; at step 320, receive an input indicating acceptance of video recording; at step 325, initiate a video recording from the user-facing camera; at step 330, display the multimedia gift message obscured by a wrapping image; and, at step 340, transmit, via the wireless communication subsystem, a recording including the video recording and a touch record including the position and timestamp of the user touch inputs.

In an embodiment, to permit a user to create a second gift message and receive and display a reaction video to the second gift message, the method 300 includes the steps of: at step 350, display, on the touchscreen, a create gift screen prompting the user to input a user-selected multimedia gift message and a user-selected wrapping image; at step 355, receive an input of the user-selected multimedia gift message as the second multimedia gift message; at step 360, receive an input of the user-selected wrapping image as the second wrapping image; at step 365, transmit, via the wireless communication subsystem, the second multimedia gift message and the second wrapping image to the central system; at step 370, receive, via the wireless communication subsystem, a second recording including a second video recording and a second touch record associated with a second multimedia gift message; and, at step 375, display, on the touchscreen, the second video recording and the second multimedia gift message obscured by a second wrapping image, wherein, for each position and timestamp of the second touch record, upon playback of the second video recording reaching the timestamp, an area of the second wrapping image around the position is removed to reveal a portion of the second multimedia gift message.

Referring back to FIG. 2, each mobile device 100 includes a memory interface 102, one or more data controllers, image controllers and/or central controllers 104, and a peripherals interface 106. The memory interface 102, the one or more controllers 104 and/or the peripherals interface 106 can be separate components or can be integrated in one or more integrated circuits. The various components in the mobile device 100 can be coupled by one or more communication buses or signal lines, as will be recognized by those skilled in the art.

Sensors, devices, and additional subsystems can be coupled to the peripherals interface 106 to facilitate various functionalities. For example, a motion sensor 108 (e.g., a gyroscope), a light sensor 110, and a positioning sensor 112 (e.g., GPS receiver) can be coupled to the peripherals interface 106 to facilitate the orientation, lighting, and positioning functions described further herein. Other sensors 114 can also be connected to the peripherals interface 106, such as a proximity sensor, a temperature sensor, a biometric sensor, or other sensing device, to facilitate related functionalities.

A camera subsystem 116 may control a rear-facing camera 118 and a forward-facing camera 119. The rear-facing camera 118 and a forward-facing camera 119 may each include and optical sensor (e.g., a charged coupled device (CCD) or a complementary metal-oxide semiconductor (CMOS) optical sensor) that can be utilized to facilitate camera functions, such as recording photographs and video clips.

Communication functions can be facilitated through one or more wireless communication subsystems 120, which can include radio frequency receivers and transmitters and/or optical (e.g., infrared) receivers and transmitters. The specific design and implementation of the communication subsystem 120 can depend on the communication network(s) over which the mobile device 100 is intended to operate. For example, the mobile device 100 can include communication subsystems 120 designed to operate over a GSM network, a GPRS network, an EDGE network, a Wi-Fi or WiMax network, and a Bluetooth network. In particular, the wireless communication subsystems 120 may include hosting protocols such that the mobile device 100 may be configured as a base station for other wireless devices.

An audio subsystem 122 can be coupled to a speaker 124 and a microphone 126 to facilitate voice-enabled functions, such as voice recognition, voice replication, digital recording, and telephony functions.

The I/O subsystem 128 can include a touch screen controller 130 and/or other input controller(s) 132. The touch-screen controller 130 can be coupled to a user display interface, such as a touch screen. The touch screen controller 130 can, for example, detect contact and movement, or break thereof, using any of a plurality of touch sensitivity technologies, including but not limited to capacitive, resistive, infrared, and surface acoustic wave technologies, as well as other proximity sensor arrays or other elements for determining one or more points of contact with the touch screen 134. The other input controller(s) 132 can be coupled to other input/control devices 136, such as one or more buttons, rocker switches, thumb-wheel, infrared port, USB port, and/or a pointer device such as a stylus. The one or more buttons (not shown) can include an up/down button for volume control of the speaker 124 and/or the microphone 126.

The memory interface 102 can be coupled to memory 138. The memory 138 can include high-speed random access memory and/or non-volatile memory, such as one or more magnetic disk storage devices, one or more optical storage devices, and/or flash memory (e.g., NAND, NOR). The memory 138 can store operating system instructions 140, such as Darwin, RTXC, LINUX, UNIX, OS X, iOS, ANDROID, BLACKBERRY OS, BLACKBERRY 10, WINDOWS, or an embedded operating system such as VxWorks. The operating system instructions 140 may include instructions for handling basic system services and for performing hardware dependent tasks. In some implementations, the operating system instructions 140 can be a kernel (e.g., UNIX kernel).

The memory 138 may also store communication instructions 142 to facilitate communicating with one or more additional devices, one or more computers and/or one or more servers. The memory 138 may include graphical user interface instructions 144 to facilitate graphic user interface processing; sensor processing instructions 146 to facilitate sensor-related processing and functions; phone instructions 148 to facilitate phone-related processes and functions; electronic messaging instructions 150 to facilitate electronic-messaging related processes and functions; web browsing instructions 152 to facilitate web browsing-related processes and functions; media processing instructions 154 to facilitate media processing-related processes and functions; GPS/Navigation instructions 156 to facilitate GPS and navigation-related processes and instructions; camera instructions 158 to facilitate camera-related processes and functions; and/or other software instructions 160 to facilitate other processes and functions (e.g., access control management functions, etc.). The memory 138 may also store other software instructions controlling other processes and functions of the mobile device 100 as will be recognized by those skilled in the art. In some implementations, the media processing instructions 154 are divided into audio processing instructions and video processing instructions to facilitate audio processing-related processes and functions and video processing-related processes and functions, respectively. An activation record and International Mobile Equipment Identity (IMEI) 162 or similar hardware identifier can also be stored in memory 138.

Each of the above identified instructions and applications can correspond to a set of instructions for performing one or more functions described herein. These instructions need not be implemented as separate software programs, procedures, or modules. The memory 138 can include additional instructions or fewer instructions. Furthermore, various functions of the mobile device 100 may be implemented in hardware and/or in software, including in one or more signal processing and/or application specific integrated circuits. Accordingly, the mobile device 100, as shown in FIG. 1B, may be adapted to perform any combination of the functionality described herein.

One or more controllers 70, 104 control aspects of the systems and methods described herein. The one or more controllers 70, 104 may be adapted run a variety of application programs, access and store data, including accessing and storing data in associated databases, and enable one or more interactions via the mobile device 100. Typically, the one or more controllers 70, 104 are implemented by one or more programmable data processing devices. The hardware elements, operating systems, and programming languages of such devices are conventional in nature, and it is presumed that those skilled in the art are adequately familiar therewith.

For example, the one or more controllers 70, 104 may be a PC based implementation of a central control processing system utilizing a central processing unit (CPU), memories and an interconnect bus. The CPU may contain a single microprocessor, or it may contain a plurality of microprocessors for configuring the CPU as a multi-processor system. The memories include a main memory, such as a dynamic random access memory (DRAM) and cache, as well as a read only memory, such as a PROM, EPROM, FLASH-EPROM, or the like. The system may also include any form of volatile or non-volatile memory. In operation, the main memory stores at least portions of instructions for execution by the CPU and data for processing in accord with the executed instructions.

The one or more controllers 70, 104 may also include one or more input/output interfaces for communications with one or more processing systems. Although not shown, one or more such interfaces may enable communications via a network, e.g., to enable sending and receiving instructions electronically. The communication links may be wired or wireless.

The one or more controllers 70, 104 may further include appropriate input/output ports for interconnection with one or more output displays (e.g., monitors, printers, user interface 170, motion-sensing input device 108, etc.) and one or more input mechanisms (e.g., keyboard, mouse, voice, touch, bioelectric devices, magnetic reader, RFID reader, barcode reader, user interface 170, motion-sensing input device 108, etc.) serving as one or more user interfaces for the controller 70, 104. For example, the one or more controllers 70, 104 may include a graphics subsystem to drive the output display. The links of the peripherals to the system may be wired connections or use wireless communications.

Although summarized above as a PC-type implementation, those skilled in the art will recognize that the one or more controllers 70, 104 also encompasses systems such as host computers, servers, workstations, network terminals, and the like. Further one or more controllers 70, 104 may be embodied in a mobile device 100, such as a mobile electronic device, like a smartphone or tablet computer. In fact, the use of the term controller is intended to represent a broad category of components that are well known in the art.

Hence aspects of the systems and methods provided herein encompass hardware and software for controlling the relevant functions. Software may take the form of code or executable instructions for causing a controller or other programmable equipment to perform the relevant steps, where the code or instructions are carried by or otherwise embodied in a medium readable by the controller or other machine. Instructions or code for implementing such operations may be in the form of computer instruction in any form (e.g., source code, object code, interpreted code, etc.) stored in or carried by any tangible readable medium.

As used herein, terms such as computer or machine "readable medium" refer to any medium that participates in providing instructions to a controller for execution. Such a medium may take many forms. Non-volatile storage media include, for example, optical or magnetic disks, such as any of the storage devices in any computer(s) shown in the drawings. Volatile storage media include dynamic memory, such as main memory of such a computer platform. Common forms of computer-readable media therefore include for example: a floppy disk, a flexible disk, hard disk, magnetic tape, any other magnetic medium, a CD-ROM, DVD, any other optical medium, punch cards paper tape, any other physical medium with patterns of holes, a RAM, a PROM and EPROM, a FLASH-EPROM, any other memory chip or cartridge, or any other medium from which a computer can read programming code and/or data. Many of these forms of computer readable media may be involved in carrying one or more sequences of one or more instructions to a processor for execution.

It should be noted that various changes and modifications to the presently preferred embodiments described herein will be apparent to those skilled in the art. Such changes and modifications may be made without departing from the spirit and scope of the present invention and without diminishing its attendant advantages.

We claim:

1. A multimedia gift system comprising:
   a user-facing camera;
   a touchscreen display;
   a wireless communication subsystem in communication with a central system;
   a controller that controls the touchscreen display, the user-facing camera, and the wireless communication subsystem; and
   a memory in communication with the controller, the memory including instructions, that when executed by the controller, cause the controller to:
   display, through the touchscreen display, a user interface that receives user inputs,
   receive, via the wireless communication subsystem, a multimedia gift message,
   initiate a video recording from the user-facing camera, display the multimedia gift message obscured by a wrapping image, in response to receiving a user touch input at a position on the touchscreen display:
   record the position and a timestamp associating the touch input to the recording; and
   remove an area of the wrapping image around the position to reveal a portion of the multimedia gift message, wherein the area is a circular area with a diameter corresponding to the width of a human finger,
   transmit, via the wireless communication subsystem, a recording including the video recording and a touch record including the position and timestamp of the user touch inputs,
   receive, via the wireless communication subsystem, a second recording including a second video recording and a second touch record associated with a second multimedia gift message, and
   display, on the touchscreen, the second video recording and the second multimedia gift message obscured by a second wrapping image, wherein, for each position and timestamp of the second touch record, upon playback of the second video recording reaching the timestamp, an area of the second wrapping image around the position is removed to reveal a portion of the second multimedia gift message.

2. The multimedia gift system of claim 1, wherein the memory includes further instructions, that when executed by the controller, cause the controller to:

display, on the touchscreen, a preview of the view from the user-facing camera and a request to permit video recording, and receive an input indicating acceptance of video recording.

3. The multimedia gift system of claim 1, wherein the wrapping image completely obscures the multimedia gift message.

4. The multimedia gift system of claim 1, wherein the area is a circular area with a diameter less than twenty millimeters.

5. The multimedia gift system of claim 1, wherein the memory includes further instructions, that when executed by the controller, cause the controller to:

display, on the touchscreen, a create gift screen prompting the user to input a user-selected multimedia gift message and a user-selected wrapping image, receive an input of the user-selected multimedia gift message as the second multimedia gift message, receive an input of the user-selected wrapping image as the second wrapping image, and transmit, via the wireless communication subsystem, the second multimedia gift message and the second wrapping image to the central system.

6. The multimedia gift system of claim 1, wherein the multimedia gift message includes an image representing a gift card.

7. The multimedia gift system of claim 1, wherein the multimedia gift message includes a video.

8. The multimedia gift system of claim 1, wherein the multimedia gift message includes an image with accompanying audio.

* * * * *